United States Patent [19]

Scott

[11] Patent Number: 5,397,082
[45] Date of Patent: Mar. 14, 1995

[54] SPACE TRANSPORT ARCHITECTURE AND METHOD FOR ROBOTIC PLANETARY OPERATIONS

[76] Inventor: David R. Scott, 1300-B Manhattan Ave., Manhattan Beach, Calif. 90266

[21] Appl. No.: 6,920

[22] Filed: Mar. 16, 1993

[51] Int. Cl.6 .............................................. B64G 1/10
[52] U.S. Cl. .................................. 244/158 R; 244/2; 244/160
[58] Field of Search ............... 244/2, 158 R, 160, 162, 244/172, 163

[56] References Cited

PUBLICATIONS

Parkinson "Prospects For Interplanetary Exploration" Spaceflight, vol. 24 No. 3 Mar. 1982, pp. 97–102.
"Planetary Entry Systems" General Electric Brochure Jan. 1979.
Reed, "High–Flying Mini Sniffer RPV Mars Bound" Aeronautics & Astronautics, Jun. 1978 pp. 26–39.

*Primary Examiner*—Galen L. Barefoot
*Attorney, Agent, or Firm*—William H. Drummond

[57] ABSTRACT

A space transport architecture (STA) for robotic operations on a planet. The STA comprises and an earth launch vehicle (ELV) (10), adapted to carry a space transfer vehicle (STV) (15) and associated payloads (17) into low earth orbit (LEO). The space transfer vehicle (STV) (15), carried by the ELV (10), is adapted to carry associated payloads from LEO in the planetary orbit and to dispense these payloads (17) from planetary orbit for landing in the locus of at least one planetary exploration site. At least one planetary lander (17) is carried by the STV. The lander (17) is adapted to carry a plurality of robotic operational platforms (58) and deploy these platforms in the locus of the exploration site. A plurality of robotic operational platforms (58) is carried by each of the landers (17).

12 Claims, 5 Drawing Sheets

SPACE TRANSPORT ARCHITECTURE AND METHOD FOR ROBOTIC PLANETARY OPERATIONS

This application is a continuation of International Application PCT/US91/03747, filed May 28, 1991.

This invention relates to a Space Transport Architecture (STA) for robotic planetary operations.

In another respect, the invention pertains to a space transport method for such operations.

In a further and more particular respect the invention pertains to an STA and method especially adapted for planetary exploration missions.

In a further and still more particular aspect the invention provides an architecture and method for carrying out short-term loosely coupled missions to a variety of planetary landing sites on each mission, e.g., sites which are local, regional or global.

According to a further aspect, the invention provides for planetary exploration by a variety of robotic operational platforms using a variety of sensors, cameras, seismic devices and other payloads such as for sampling operations and the like.

In still further and more particular respect the invention relates to STAs and methods especially adapted for robotic collection of planetary geologic samples and for returning such samples to Earth.

The robotic exploration of planetary surfaces, especially the Moon and Mars, is currently of major interest to the worldwide scientific community, for two reasons. First, recent cost estimates for human expeditions, especially to Mars, appear to be beyond the fiscal capacity of any one nation, or even groups of nations. Second, the technological advances in artificial intelligence, miniaturization of electrical and mechanical devices, and performance of scientific sensors, have been substantial during the past several years. Commensurate with these advances has been a substantial reduction in the cost of collecting sophisticated scientific data with these new sensors as well as the computational capabilities necessary to implement artificially intelligent functions to control mechanical devices.

Based on a comparison of the requirements and capabilities of the scientific exploration conducted during the Apollo Program with those of an innovative robotic program of today, it appears that properly designed and operated artificial intelligent robots could perform successfully almost all of the direct, preplanned scientific investigations conducted during the six successful Apollo lunar surface expeditions during 1969-1972, again, for two reasons.

First, during Apollo and other programs of the time, NASA developed methods and techniques of scientific investigation on the surface of a planet based on, for the most part, the faculties and capabilities of human beings in situ. Robotics, at the time, had not evolved to the point of being able to challenge the faculties and capabilities of humans.

Second, today, with the aforementioned advances, certain mobile robotic platforms, with proper sensors, are capable of not only replicating tangible human qualities, but the sensors available today are in many cases "superhuman", with performance and qualities far beyond those of comparable functions in the human form. And these surrogate platforms and sensors require far less environmental protection, operational support, and consumable substance.

Therefore, it would be highly desirable to apply these new technological capabilities to a low cost, reliable planetary surface exploration architecture. Such architecture would include not only flexible mobile, and responsive platforms on the surface, which apply the proven methods and techniques of Apollo scientific investigations, but also a low-cost, near-term, reliable space transportation system.

Accordingly, the principal object of the present invention is to provide a space transport architecture (STA) for robotic planetary operations.

Another object of the invention is to provide a transport method for carrying out such robotic planetary operations.

Still another object of the invention is to provide a space transport architecture and method which is specially adapted to carry out robotic exploration of planets.

Still another and more particular object of the invention is to provide a space transportation architecture and method for conducting planetary geophysical exploration.

A further and still more specific object of the invention is to provide a space transportation architecture and method for robotically collecting planetary geophysical specimens and samples and returning them to the Earth.

These and other, further and more specific objects and advantages of the invention will be apparent to those skilled in the art from the following detailed description thereof, taken in conjunction with the drawings, in which.

Figure 1:
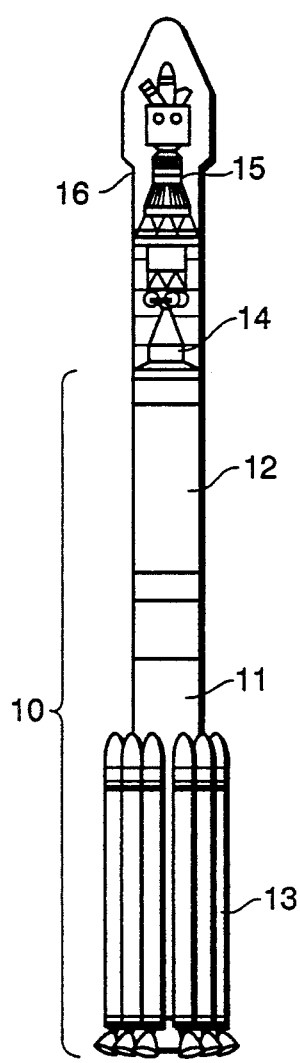
FIG. 1 is a partially cut away view of assembled components which typify the space transport architecture of the invention, according to one embodiment of the invention.

As used herein, the term "planet" includes planets, moons, asteroids and comets.

The term "earth launch vehicle" or "ELV" means a rocket which is capable of delivering a payload to a ballistic space trajectory or to low earth orbit ("LEO"). Such ELVs are constructed to withstand dynamic atmospheric effects such as wind, rain, turbulence, ice, shear and lightning, and the pressure and thermal effects of atmospheric drag during earth ascent. ELVs include rocket systems which may consist of two or more "stages" each of which is dropped during the ascent phase of the launch sequence when its propellant is expended, thus reducing the dead weight of the vehicle. These stages may be mounted in tandem or "strapped-on" the outside of the core first stage. Most ELVs presently used commercially are either duplicates or derivatives of Intercontinental Ballistic Missiles (ICBMS) developed during the 1950's and 1960's and which were designed to deliver a payload to a ballistic space trajectory or to LEO.

The term "space transfer vehicle" or "STV" means a rocket vehicle, typically including a main engine, attitude control, guidance and communications systems, fuel supplies, etc., usually constructed as an exoatmospheric vehicle because it is only subjected to relatively static conditions in space such as radiation from the sun and bombardment by my new particular matter. Such STVs are adapted to carry payloads from LEO to other space trajectories, including transplanetary trajectories and planetary orbit insertion and may be configured for planetary descent and ascent operations. Typical STVs include the Viking Orbiter, Peacekeeper Stage IV, and the Satellite Transfer Vehicles disclosed in U.S. Pat. Nos. 4,896,848 and 4,664,343.

According to a presently preferred embodiment of the invention, the ELV-STV components of the STA are those disclosed in pending U.S. application Ser. No. 472,395, filed Jan. 30, 1990 entitled "Space Transfer Vehicle and Integrated Guidance Launch System", now issued U.S. Pat. No. 5,186,419.

The term "planetary lander" means apparatus for carrying payloads distributed from an STV in planetary orbit to a landing on the surface of the plant and includes both ballistic vehicles such as the Ranger V Lunar Landing Capsule and maneuverable vehicles, for example, an STV adapted for planetary descent and landing or the Rockwell "lightweight exoatmospheric projectile" known as LEAP-I developed in the SDI program.

The robotic operational platforms used in accordance with the present invention may, illustratively, include both mobile and fixed platforms. Examples of mobile platforms include the rovers described in the paper entitled "Mini-Rovers for Mars Exploration" proceedings of the Vision-21 Symposium, Cleveland, Ohio, April, 1990. And the papers therein cited. Further examples of mobile rovers include the "ROBBY" developed by JPL. Examples of fixed robotic operational platforms include "MESUR", proposed by NASA for the Mars scientific station and pentatrometers used on the USSR Mars Probe.

From the foregoing it will be apparent to those skilled in the art that significant examples of each of the components of the STA of the present invention are already in existence and that there is no need for the development of significant additional technology in order to implement the invention. Moreover, it will be understood that the present invention is not limited by such examples which are referenced only for purposes of illustration and not by way of limitation on the scope of the invention which is defined by the appended claims.

Briefly, in accordance with the invention, I provide a space transport architecture (STA) for robotic operations on a planet. The STA comprises an earth launch vehicle (ELV), adapted to carry a space transfer vehicle (STV) and associated payloads into low earth orbit (LEO). The space transfer vehicle (STV), carried by the ELV, is adapted to carry associated payloads from LEO into planetary orbit and to dispense these payloads from planetary orbit for landing in the locus of at least one planetary exploration site. At least one planetary lander is carried by the STV. The lander is adapted to carry a plurality of robotic operational platforms and deploy these platforms in the locus of the exploration site. A plurality of robotic operational platforms is carried by each of the landers.

In one embodiment of the invention the STV comprises at least two stages, a first stage (STV-1) for insertion into transplanetary trajectory and an upper stage STV-2 for planetary orbit insertion.

According to a further embodiment, the STV-2 is the lander and is adapted for planetary descent, planetary touch down and platform deployment.

In the preferred embodiment of the invention the STA includes a plurality of landers and the STV is adapted to dispense each of said landers for landing in the locus of a different planetary exploration site. In a further embodiment, the STA includes a planetary ascent vehicle carried by the lander. The planetary ascent vehicle (PVA) is adapted to rendezvous in planetary orbit with an earth return vehicle (ERV). In a preferred embodiment the ERV is integral with the STV.

In a still further embodiment the STA is adapted for geophysical exploration of the planet. In this configuration, at least one of the robotic operational platforms is adapted to obtain and deliver a geologic sample to the PAV and the PAV is adapted to deliver the sample to the ERV.

According to yet another embodiment, I provide a method for conducting robotic planetary operations comprising launching from the earth a payload comprising a plurality of planetary landers, each lander carrying a plurality of robotic planetary operations platforms. The payload is inserted into planetary orbit and the landers are dispensed for landing at a plurality of sites on the planet. After landing, the plurality of robotic platforms are deployed from each lander at each of the exploration sites.

According to another embodiment of this method, a planetary geologic sample is collected by at least one of the robotic platforms and is transferred from the platform to an earth return vehicle.

Figure 2:
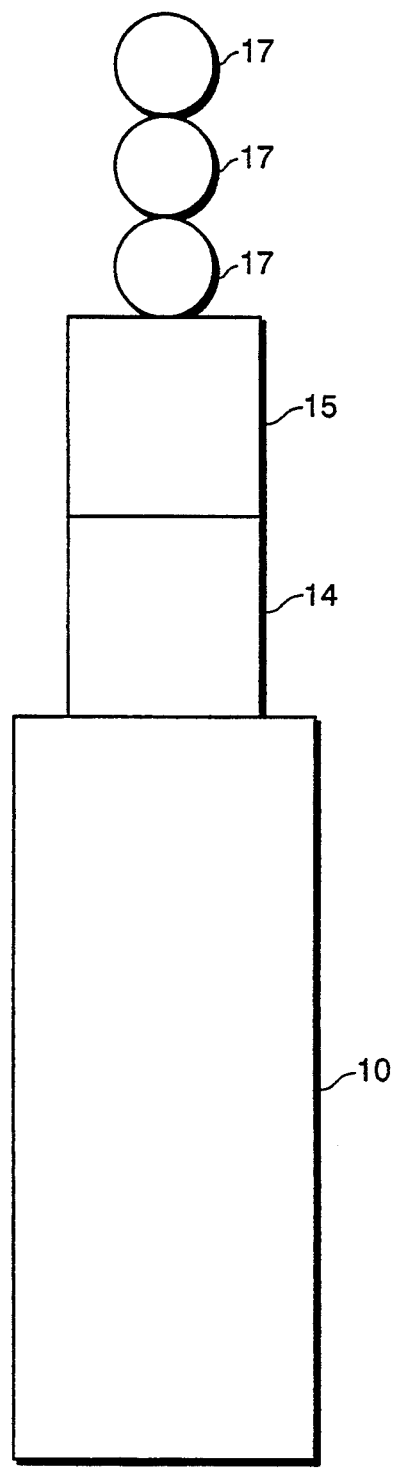
FIG. 2 is a schematic representation of the components of the assembled STA of FIG. 1.

Turning now to the drawings, in which like reference characters are used to identify similar elements in the several view, FIG. 1 and 2 depict an assembly of components which illustrate the STA. The ELV 10, illustratively a Delta II, comprises a first stage 11, a second stage 12 and thrust augmentation solid rocket motors 13, STV-1 14 and STV-2 15 are carried on ELV 10 within a protective payload fairing 16.

As indicated in FIG. 2 a plurality of landers 17 are carried by STV-2 15. Illustratively STV-1 14 is the STV disclosed in the U.S. Pat. No. '848 and '343 patents, identified above, and the STV-2 is the NASA Mars Viking Orbiter. Landers 17 can illustratively comprise a plurality of Rockwell LEAP-1 STV vehicles, each carrying a plurality of behavior controlled robotic mini rovers of the type described in the Vision 21 Symposium paper by David P. Miller of the JPL.

Figure 3:
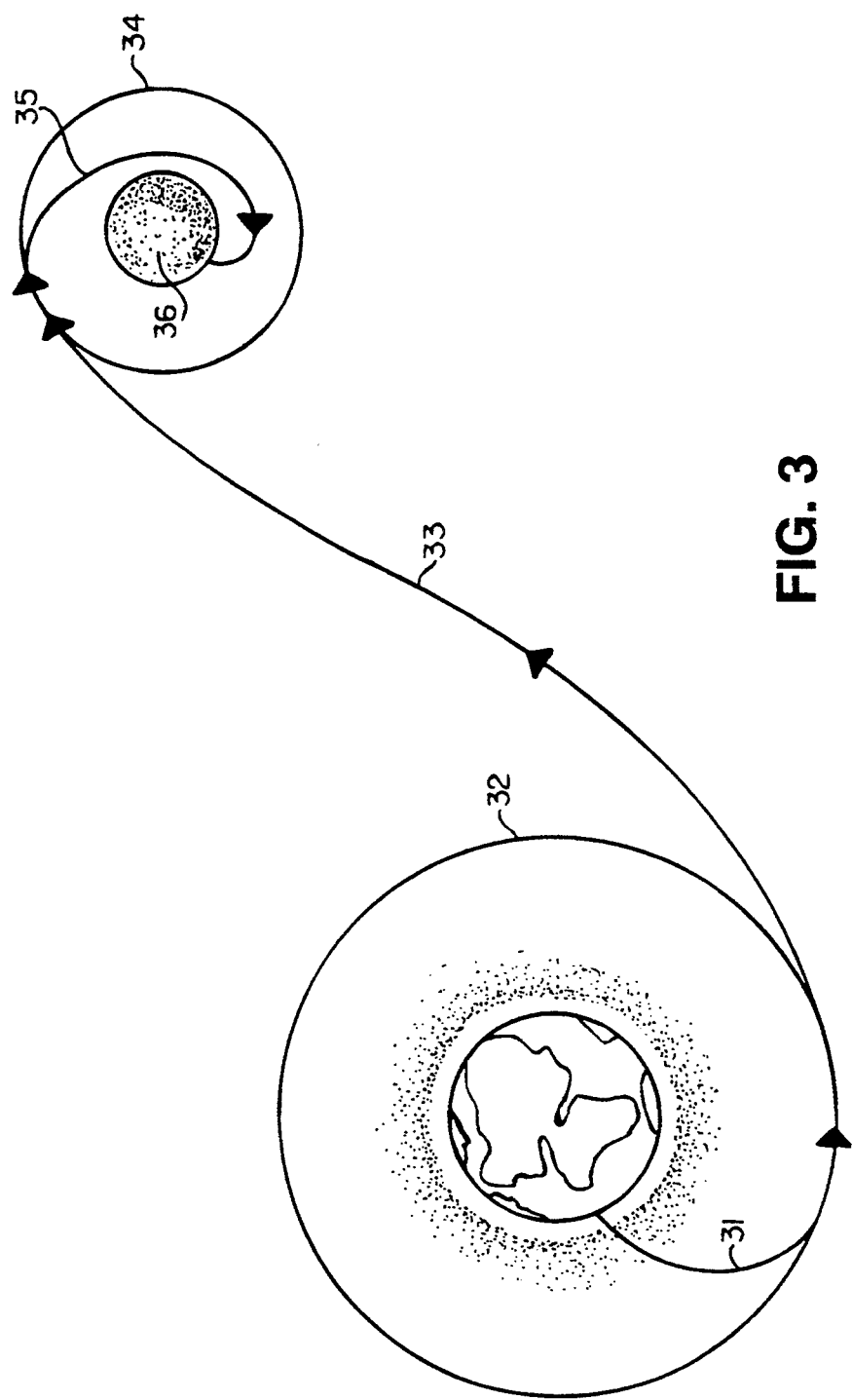
FIG. 3 illustrates a typical mission scenario utilizing the STA and method of the invention to conduct robotic planetary operations.

FIG. 3 illustrates a typical mission scenario utilizing the STA of FIG. 1–2 according to the method of the invention. EALV propels the SDA through earth launch 31 into LEO 32. The STV is supported from the EALV and transports the associated payloads from LEO 32 into transplanetary trajectory 33 and into planetary orbit 34. A lander is dispensed by the STV into landing trajectory 35 for landing on the planet 36.

Figure 4:
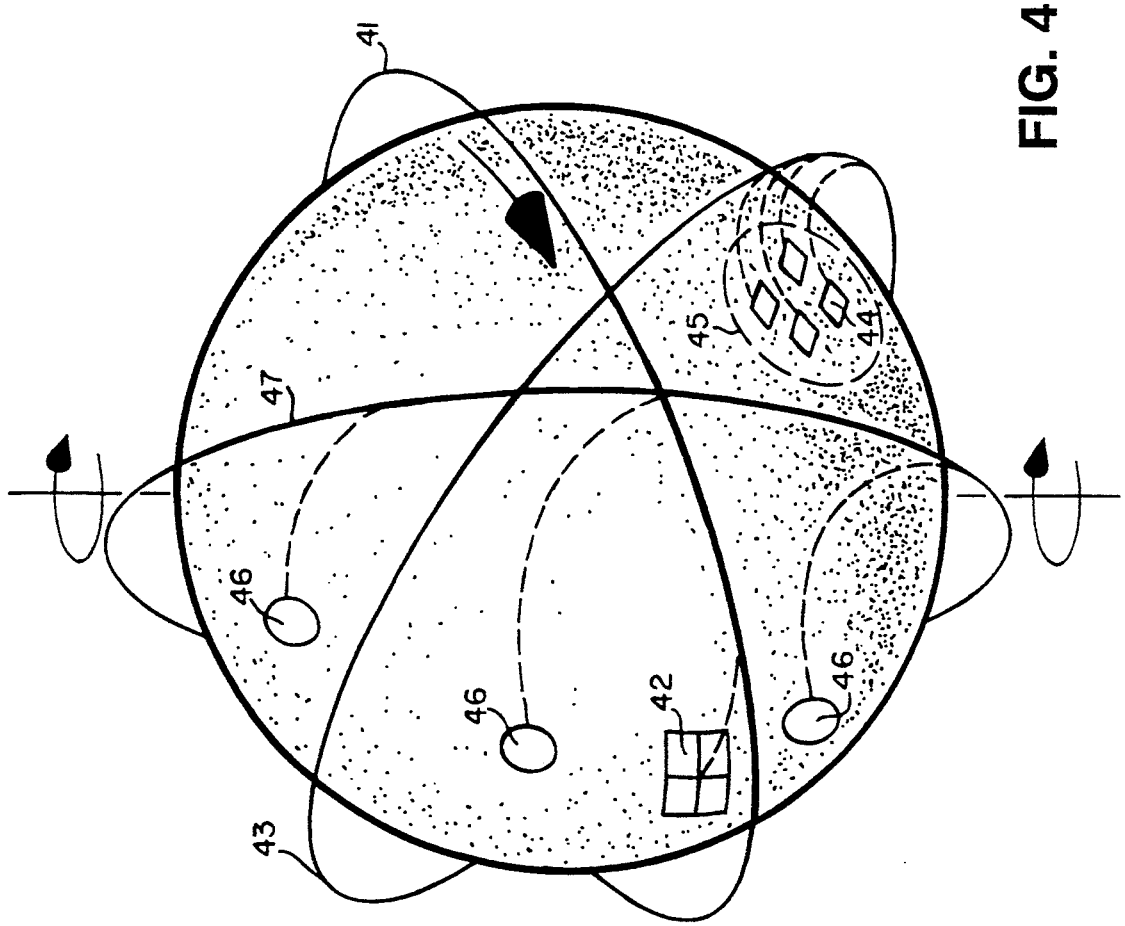
FIG. 4 depicts typical orbital mechanics applications for conducting robotic planetary surface operations at local, regional and global landing sites.

Referring to FIG. 4 which illustrates planetary orbital mechanics applications, the inclination of the planetary orbit is selected to provide the desired combination of a landing site or sites. Thus, planetary orbit 41 provides for a "local" landing site, 42, i.e., a single specific site for landing the maximum number of operational platforms. The number of platforms is maximized by minimizing the energy requirements to reach that site by proper selection of the inclination of the orbit 41, the launch window and other recognized factors. A higher orbit 43 is selected to provide "regional" landing sites 44 in an area 45, e.g., 1–4,000 Km of the planetary surface, each landing site accommodating a valuable number of platforms, all near the path of the same orbital trajectory 43, disbursed by planetary rotation under the orgit 43.

"Global" landing sites 46 are provided by sleecting a polar or high inclination orbit 47. This orbit has the highest energy requirement thus lowest total launch mast of landers and platforms, disbursed by planetary rotation under the orbit 47.

Figure 5:
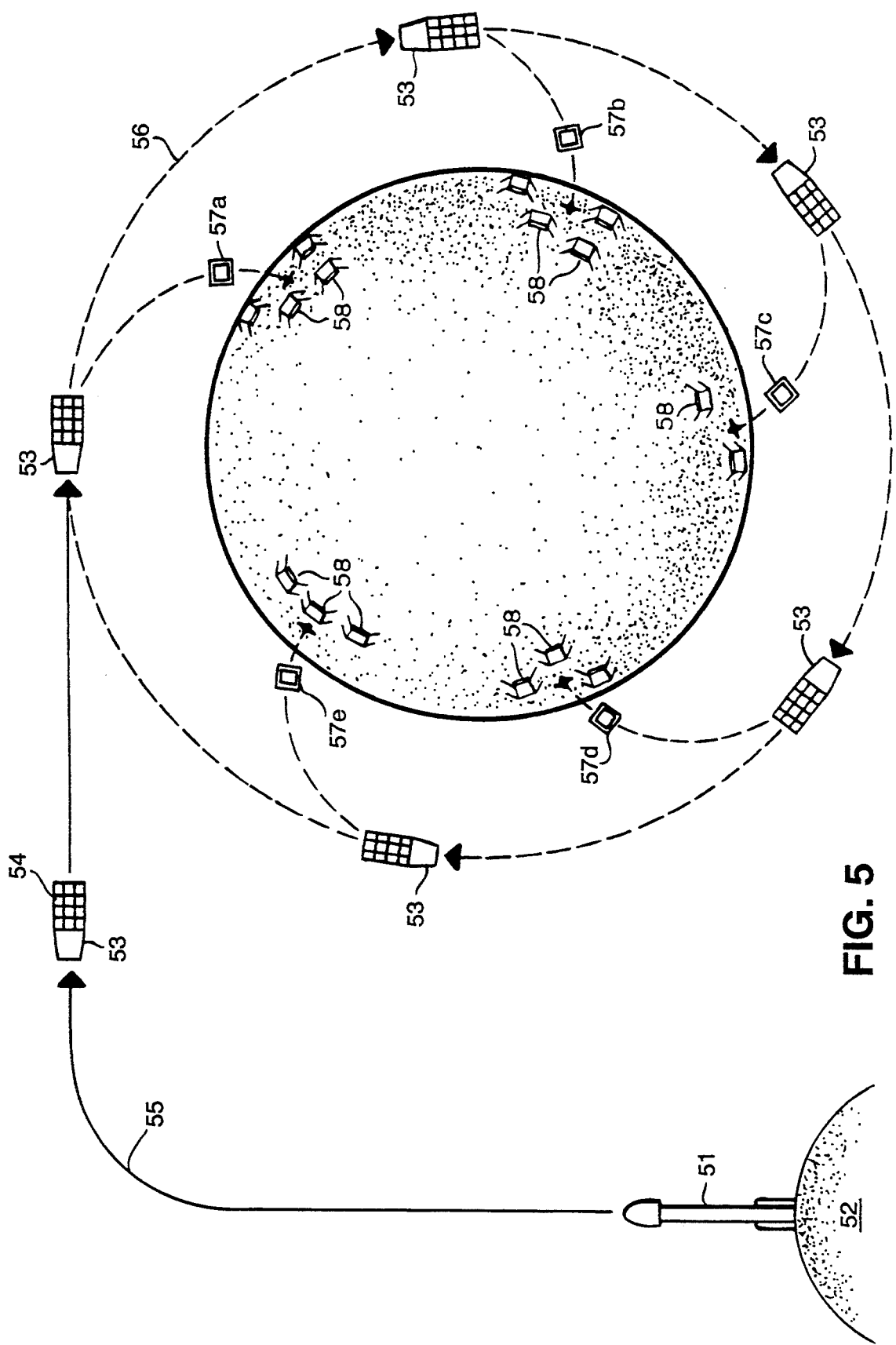
FIG. 5 depicts a typical mission scenario utilizing the STA and method of the present invention to dispense multiple robotic operational platforms at a plurality of sites on a planet.

FIG. 5 further illustrates a mission scenario for distributing a plurality of platforms at global landing sites. The STA 51 is launched from earth 52 and the STV 53 carries multiple landers 54 through transplanetary trajectory 55 and accomplishes insertion in to planetary orbit 56. A plurality of landers 57a–57e are dispensed by STV 53 to a plurality of landing sites. At each landing site a plurality of robotic operational platforms, e.g., mini rovers 58 are deployed to accomplish ultimate mission objectives, e.g., visual, seismic, geological and chemical investigations.

Figure 6:
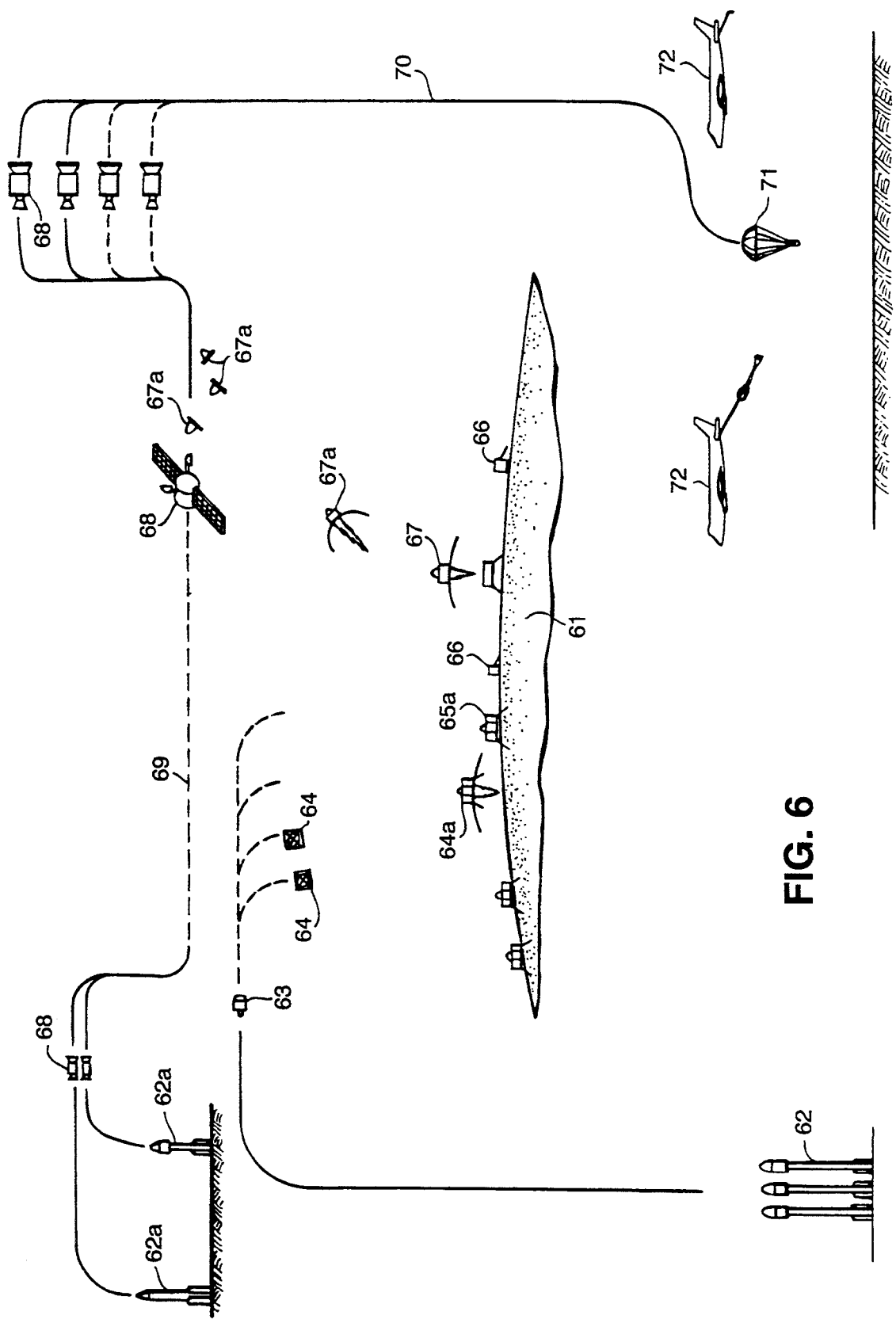
FIG. 6 illustrates a typical mission scenario involving collection and return to earth of planetary geologic samples.

FIG. 6 illustrates a typical mission scenario for geologic exploration of a planet 61. One or more STAs 62 are launched from earth, each carrying an STV 63 which distributes landers 64 at one or more planetary sites. The landers 64 are STVs which can accomplish planetry descent as indicated at 64a. After landing as indicated at 65a, the landers deploy mobile operational platforms 66. One or more of the platforms 66 collects geologic samples which are returned to the landers 66. A planetary ascent vehicle (PAV) 67, e.g., LEAP-1 carrries the samples into planetary orbit, as indicated at 67a. Meanwhile, using similar ELVs 62a, one or more STVs which function as Earth Return Vehciles (ERVs) 68 are launched from earth and into planetary orbit 69. The PAVs 67a–67c redezvous with the ERV 68 in planetary orbit 69 which collects the samples and returns the sample containers into LEO 70 from which that are ejected for parachute return 71 into the earth's atmosphere for recovery by high altitude aircraft 72. Alternatively, in another embodiment of the invention, the STV 63 includes an ERV which functions both as the PAV and the ERV.

Having described my invention in such terms as to enable those skilled in the art to understand and practice it and having identified the presently preferred embodiments thereof, I claim:

1. The space transport architecture (STA) for robotic operations on a planet, comprising:
   (a) an earth launch vehicle (ELV), adapted to carry a space transfer vehicle (STV) and associated payloads into low earth orbit (LEO);
   (b) a space transfer vehicle (STV), carried by said ELV, adapted to carry associated payloads from LEO into planetary orbit and to dispense said payloads from planetary orbit for landing in the locus of at least one planetary exploration site; and
   (c) at least one planetary lander carried by said STV, adapted to carry a plurality of robotic operational platforms and deploy said platforms in said locus;
   (d) a plurality of robotic operational platforms carried by said lander.

2. The STA of claim 1, in which said STV comprises at least two stages, a first stage (STV-1) for insertion into a transplanetary trajectory and an upper stage (STV-2) for planetary orbit insertion.

3. The STA of claim 2, in which the lander is the STV-2 adapted for planetary descent, planetary touchdown and platform deployment.

4. The STA of claim 2, in which the STV comprises the STV-1 and the STV-2 which is adapted to carry and dispense a plurality of landers.

5. The STA of claim 4 in which the landers include at least one STV (STV-3) which is adapted for planetary descent, planetary touchdown and platform deployment.

6. The STA of claim 1 which includes a plurality of landers and in which the STV is adapted to dispense each of said landers for landing in the locus of a different planetary exploration site.

7. The STA of claim 1 which includes a planetary ascent vehicle (PAV) carried by the lander.

8. The STA of claim 7 in which the PAV is adapted to rendezvous in planetary orbit which an earth return vehicle (ERV).

9. The STA of claim 1 in which the STV includes an ERV.

10. The STA of claim 8 adapted for geophysical exploration of a planet, in which:
    (a) at least one of said robotic operational platforms is adapted to obtain and deliver a geologic sample to said PAV; and
    (b) said PAV is adapted to deliver said sample to said ERV.

11. A method for conducting robotic planetary operations comprising:
    (a) launching from the earth a payload comprising,
        (i) a plurality of planetary landers,
        (ii) each lander carrying a plurality of robotic planetary operations platforms,
    (b) inserting said payload into planetary orbit,
    (c) dispensing said landers for launching at a plurality of sites on said planet,
    (d) dispensing said plurality of platforms from each said lander at each said site.

12. The method of claim 11, further including:
    (a) collecting a planetary geologic sample by at least one of said platforms; and
    (b) transferring said sample from said platform to an earth-return vehicle.

* * * * *